(12) United States Patent
Fang

(10) Patent No.: US 7,948,903 B2
(45) Date of Patent: *May 24, 2011

(54) VOICE-AIDED DIAGNOSTIC FOR VOICE OVER INTERNET PROTOCOL (VOIP) BASED DEVICE

(75) Inventor: Zheng Fang, Horsham, PA (US)

(73) Assignee: General Instrument Corporation, Horsham, PA (US)

( * ) Notice: Subject to any disclaimer, the term of this patent is extended or adjusted under 35 U.S.C. 154(b) by 1390 days.

This patent is subject to a terminal disclaimer.

(21) Appl. No.: 11/180,377

(22) Filed: Jul. 13, 2005

(65) Prior Publication Data
US 2005/0249197 A1    Nov. 10, 2005

Related U.S. Application Data

(63) Continuation of application No. 09/766,230, filed on Jan. 19, 2001, now Pat. No. 6,940,820.

(51) Int. Cl.
*G01R 31/08* (2006.01)

(52) U.S. Cl. ........................................ 370/241; 370/252

(58) Field of Classification Search .................. 370/352, 370/241, 242; 379/21, 27, 58, 59; 375/1, 375/21, 29; 704/252, 254, 255, 257, 270
See application file for complete search history.

(56) References Cited

U.S. PATENT DOCUMENTS

| | | | |
|---|---|---|---|
| 5,297,194 A | 3/1994 | Hunt et al. | |
| 5,394,445 A | 2/1995 | Ball et al. | |
| 5,521,958 A | 5/1996 | Selig et al. | |
| 5,528,660 A | 6/1996 | Heins et al. | |
| 5,857,011 A | 1/1999 | Kennedy et al. | |
| 5,974,115 A | 10/1999 | Chan et al. | |
| 6,269,336 B1 * | 7/2001 | Ladd et al. | 704/270 |
| 6,463,130 B1 * | 10/2002 | Malik | 379/88.22 |
| 6,480,469 B1 | 11/2002 | Moore et al. | |
| 6,574,308 B1 | 6/2003 | Macdonald et al. | |
| 6,600,736 B1 | 7/2003 | Ball et al. | |
| 6,629,071 B1 * | 9/2003 | Mann | 704/251 |
| 6,675,211 B1 * | 1/2004 | Mamaghani et al. | 709/224 |
| 6,754,310 B1 | 6/2004 | Steinbrenner et al. | |
| 6,940,820 B2 * | 9/2005 | Fang | 370/242 |
| 2002/0006126 A1 * | 1/2002 | Johnson et al. | 370/356 |
| 2002/0124100 A1 * | 9/2002 | Adams | 709/232 |
| 2004/0029564 A1 * | 2/2004 | Hodge | 455/411 |

* cited by examiner

*Primary Examiner* — Ricky Ngo
*Assistant Examiner* — David Oveissi
(74) *Attorney, Agent, or Firm* — Larry T. Cullen (57) ABSTRACT

A method and apparatus are provided for using voice commands to invoke a mode of operation of a broadband network device used in a broadband communication network implemented with VOIP, such as a communication gateway. The user can interface interactively with the device through voice commands or through touch-tone data entry, and the results of the tasks performed are reported back to the user in voice format.

17 Claims, 6 Drawing Sheets

VOICE-AIDED DIAGNOSTIC FOR VOICE OVER INTERNET PROTOCOL (VOIP) BASED DEVICE

BACKGROUND

This invention relates to broadband communication networks. More particular, this invention relates to providing a voice aided diagnostic for a voice over Internet protocol (VOIP) based device of the broadband network system.

Figure 1:
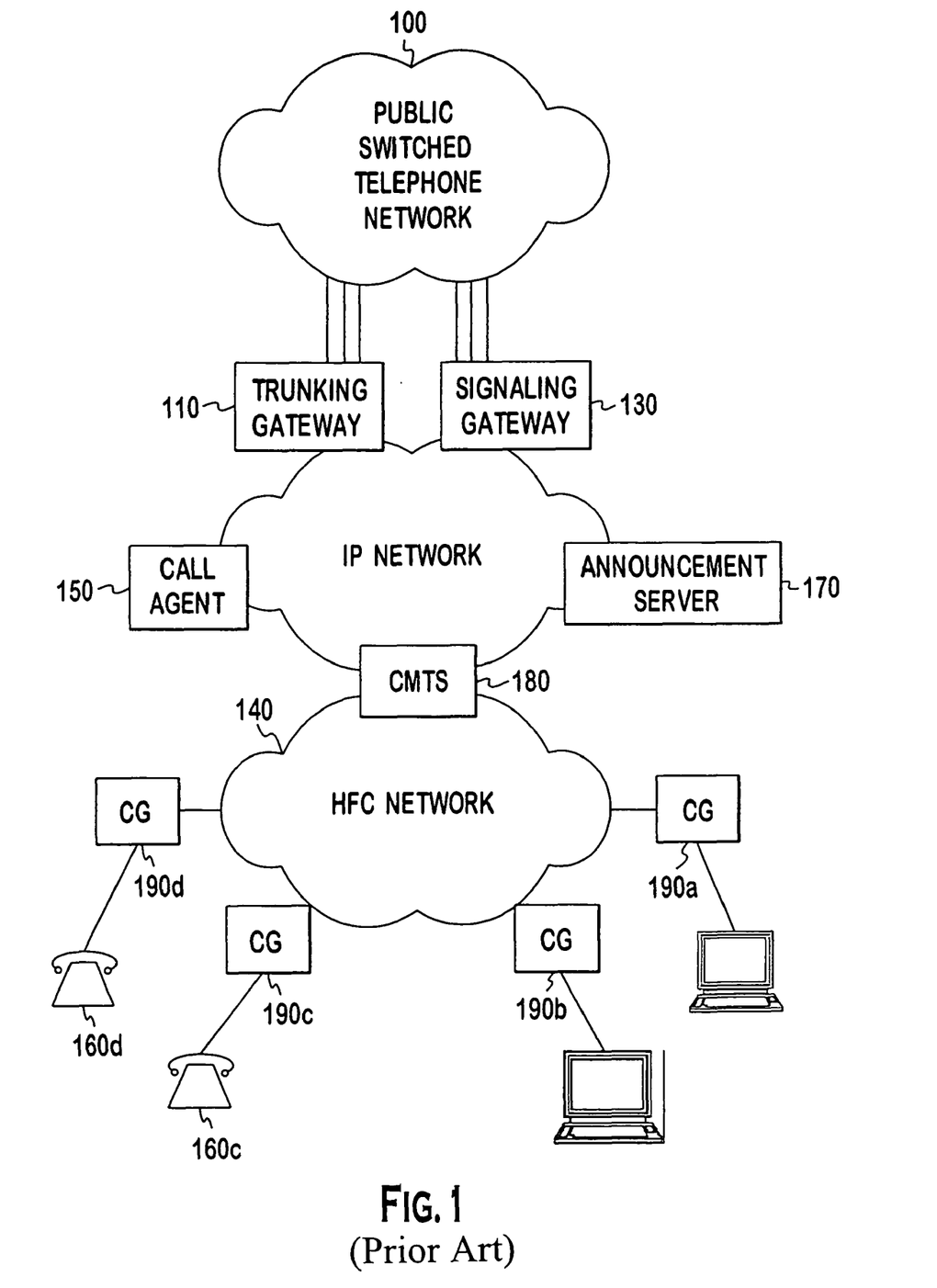
FIG. 1 is an VOIP implementation network with VOIP type devices.

In a traditional broadband network system, such as a cable TV network system, at least one communication gateway (CG) is installed at customer's premises to operate as a gateway between the customer and the administrator. The system administrator provides video and audio data to the customers and controls the flow traffic of video, audio or data to and from the customer through the CG. For example, referring to FIG. 1, an example of a VOIP architecture is shown. In FIG. 1, a plurality of residential (CGs) 190a-190d are connected to subscriber telephone handsets 160a-60d. The CGs 190a-190d act as cable modems with telephony capability. In one embodiment, each CG 190 contains a data over cable service interface specifications (DOCSIS) based modem for supporting voice, data and possibly video. Each CG 190 supports one or more distinct phone lines and a local Ethernet port for high speed data access. A cable modem termination system (CMTS) 180 connects the HFC network 140 to an Internet Protocol (IP) based network 120. The CMTS 180 acts as an edge router to convert the cable modem technology of the HFC network 140 to a standard link layer protocol, (such as Ethernet), on the IP network 120. A trunking gateway 110 provides voice connectivity between the IP network 120 and a public switched telephone network (PSTN) 100. The trunking gateway 110 performs media transcoding such as codecs and echo cancellation between both networks. As an example, the trunking gateway 110 may transcode an G.729 encoded voice stream originating from the IP network 120 to an ITU G.711 encoded voice stream destined to the PSTN 100. The references to G.711 and G.729 are standard voice compression algorithms specified by the International Telecommunication Union (ITU) and are known to those skilled in the art.

A signaling gateway 130 performs signaling interconnection between the IP network 120 and the PSTN 100. The trunking gateway 110 and the signaling gateway 130 are controlled by a call agent 150 which is also connected to the IP network 120. An announcement server 170 is utilized to deliver prerecorded messages to customers. The CG performs decryption on the incoming encrypted data, or checks the subscription of programing by the customer before any program can be viewed or received by the customer's equipment connected to the CG. A CATV network can have thousands or millions of existing customers and every customer has at least one CG installed in their premesis. Besides carrying the usual video and audio signals, the CATV networks have been increasingly used to communicate over the Internet; and a new use for CATV networks in combination with the Internet is using the network as a carrier for telephone related services. Therefore, VOIP related CATV network implementation is becoming extremely critical.

Figure 2A:
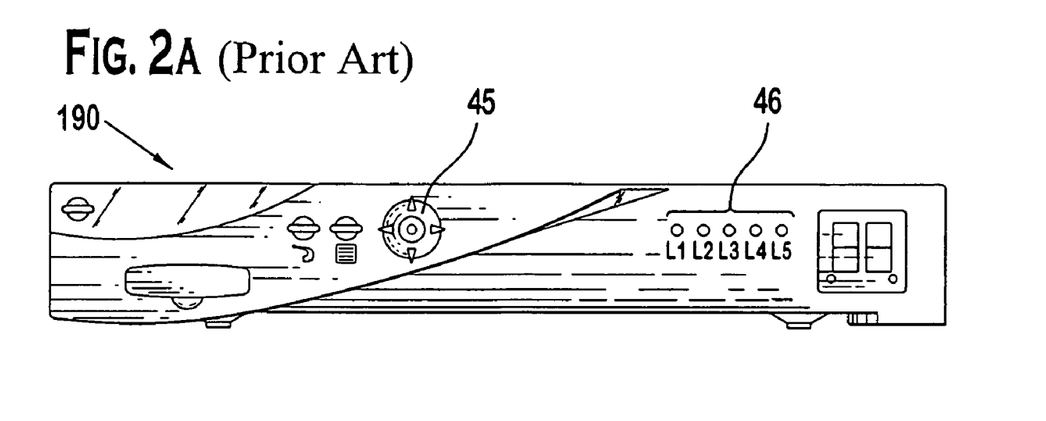
FIG. 2 is a flow chart of a prior art system using indicating lights to indicate hardware statues.

Referring to FIG. 2, a CG 190 uses a combination of indicating lights L1-L5 within and indicating light bank 46 to indicate different hardware statues once the equipment is powered on. As shown in FIG. 2, the plurality of indicating lights L1-L5 are energized in a particular sequence or configuration to indicate the status of the plurality of components within the CG 190. For example, L1 might be lit whenever the CG is energized. L2 may blink intermittently if a downstream communication is being received but may be lit constantly for an upstream communication. When performing diagnostics, a different configuration of the indicating lights L1-L5 may indicate different problems. The indicating lights L1-L5 are also useful when configuring the CG 190 for a particular customer.

Figure 3:
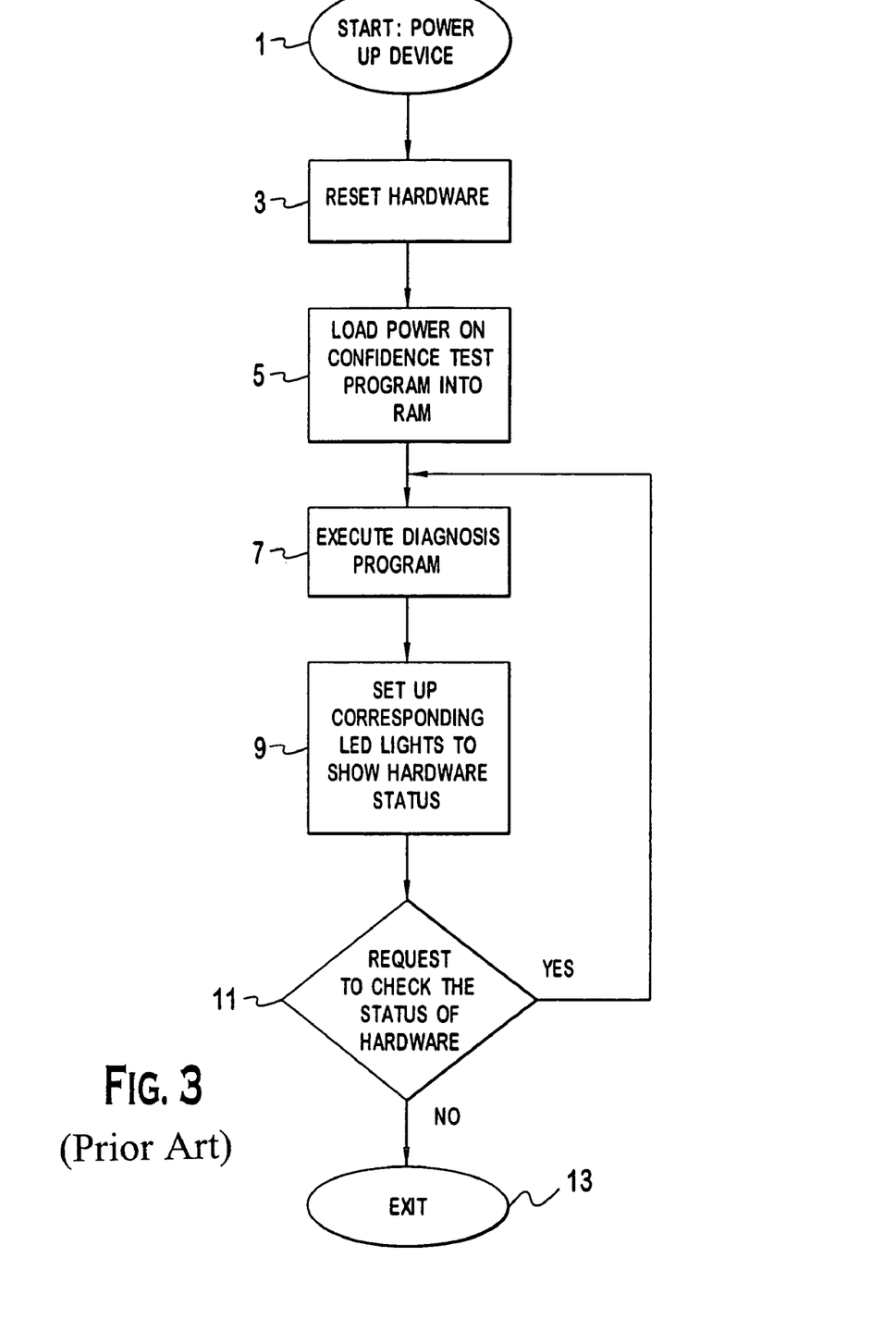
FIG. 3 is a flow chart of a prior art system power up diagnostic process.

FIG. 3 shows a procedure used by a CG 190 when powering up. The CG initiates the power up process by resetting all hardware components of the settop box (step 1 and step 3). The system loads a power-on confidence test program (test program) into the RAM (step 5), where the system starts to execute the power-on confidence test program (step 7). The test program basically tests the validity and operability of major hardware components of the system. Accordingly, the system will selectively energize the indicating lights L1-L5 to reflect the results test program (step 9). For example, indicating light 1 (L1) is on to indicate that the system processor functions well, indicating light 2 (L2) is on to indicate that the network interface is operating etc. The system can periodically execute a partial or complete test program to check its internal component and update the corresponding indicating lights accordingly (step 11). In case of a component failure, an individual lights or a combination of lights will change color, flash or turn on or off accordingly.

Increasing the functionality of a CG 190 generally means more components must be tested for operability, which leads to more indicating lights or combinations thereof. Although system administrators rely upon the correct reading of the indicating lights by customers in order to dispatch service personnel with the proper diagnostic equipment to address the problem components, it is cumbersome and difficult for a customer to interpret the different hardware states represented by different indicating lights. This process therefore, is prone to error, even when service personnel read and interpret the indicating lights. Accordingly, it is essential to provide a more user friendly and easy method to configure and diagnosis a CG for average customers and service personnel.

SUMMARY

This invention is a method and apparatus for using voice commands to invoke the self diagnostics mode of operation of a CG used in a broadband communication network implemented with VOIP. The user can interface interactively with the self diagnostic module of a CG through voice commands or through touch-tone data entry, and the results of the diagnosis will be reported back to the user in voice format.

DETAILED DESCRIPTION OF THE PREFERRED EMBODIMENTS

The present invention will be described with reference to the drawing Figures where like numerals represent like elements throughout.

Figure 4:
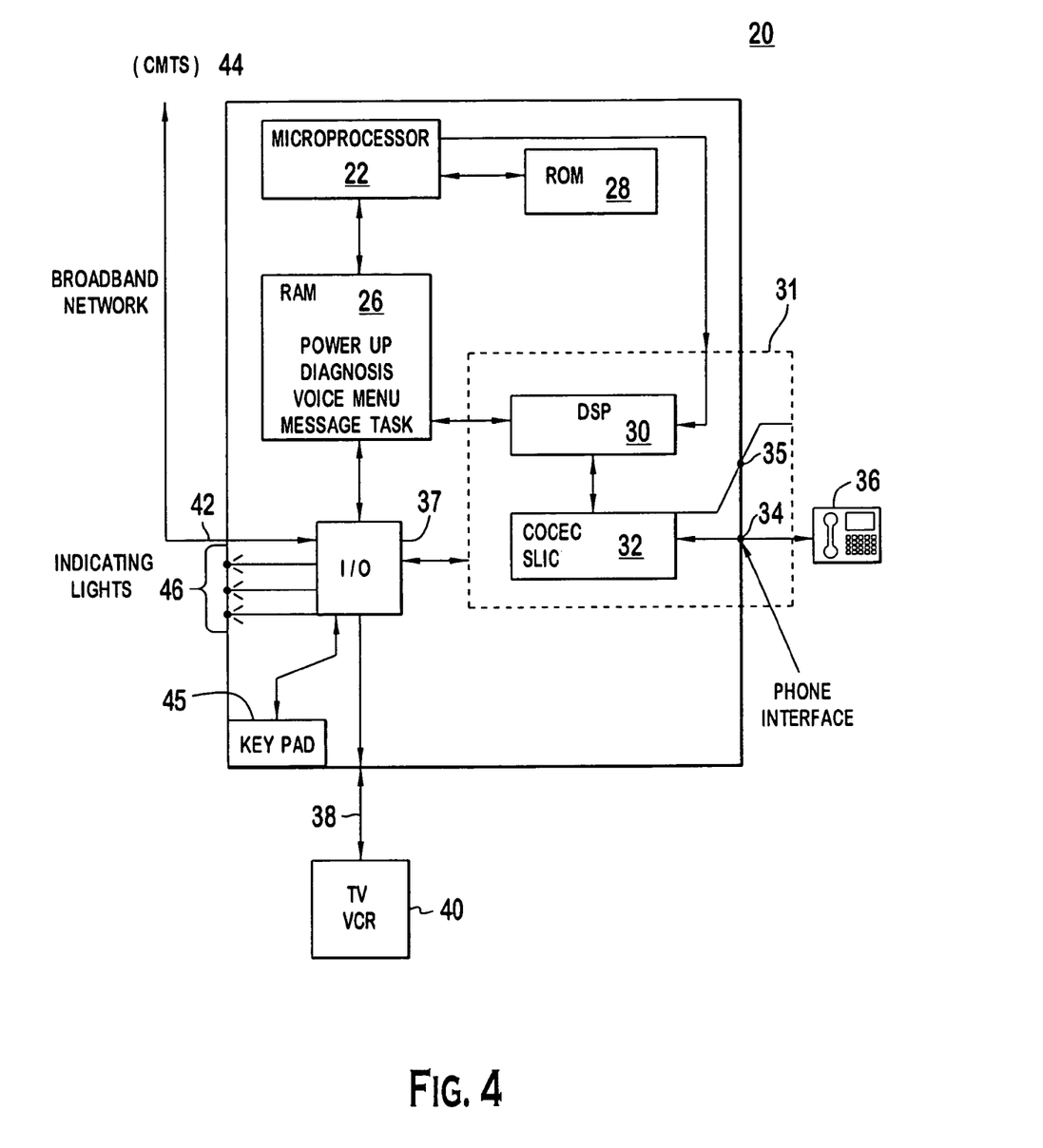
FIG. 4 is a high-level functional block diagram of one embodiment of the present invention.

FIG. 4 shows a high-level functional block diagram for a CG 20 in accordance with the present invention. The CG 20 includes a microprocessor 22, RAM 26, read-only memory (ROM) 28, I/O module 37, end user interface 38 (to TV or VCR 40), and an interface 42 to the CMTS 44 and the broadband network. Additionally, the CG 20 includes a telephone module 31 and at least one telephone interface 34 to be able to provide a VOIP interface between the CG 20 and the customer.

The ROM 28 can retain the burn-in instructions and data even without power supply. Therefore, the GC 20, a microprocessor-based device, will use ROM 28 to store the power on instructions. However, the access time from the processor 22 to a ROM to run regular tasks will be too slow. Therefore, when the GC 20 powers up, the instructions and data stored in the ROM 28 will be automatically loaded into the fast-access RAM 22, where the microprocessor 22 fetches and executes these instructions from. The I/O module 37 controls all input output communication for the GC 20. For example, the I/O module 37 and the I/O interface 42 provide connection between the GC 20 and a network system, such as CMTS.

Figure 2B:
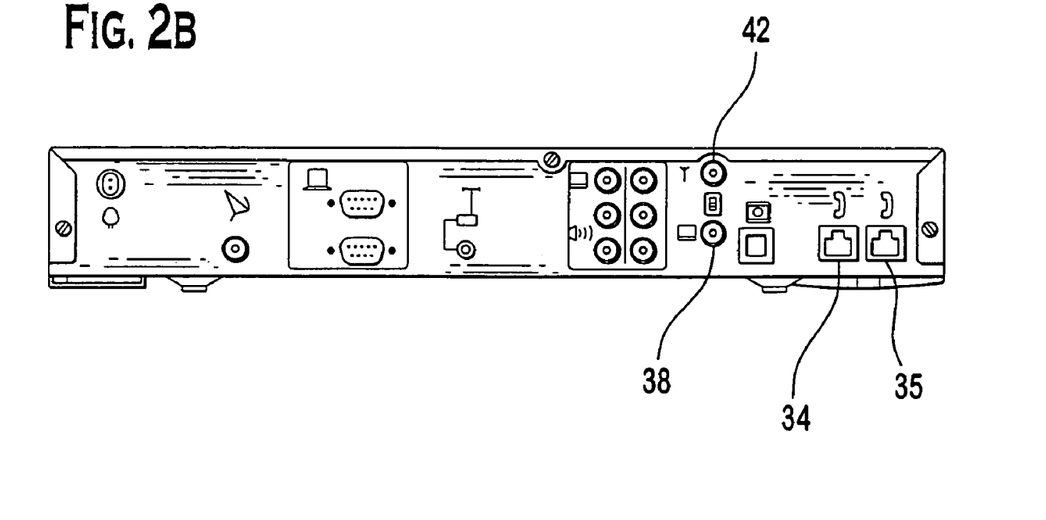

The telephone module 31 includes a digital signal processor (DSP) 30, a codec and SLIC 32 and two telephone interfaces 34, 35 which may be connected to a telephone 36. The DSP 30, working with the codec 32, converts analog signals such as the user's voice into digital signals for transmission over the broadband network to the CMTS 44, and coverts incoming digital signals from the CMTS 44 to analog format for output to the telephone set 36. Accordingly, a customer can use the CG 20 in the same manner as a traditional "two-wire" telephone line in order to communicate with any other telephone user through the PSTN 100 connection. The fact that the services are being offered over a CATV system is transparent to the user. However, in accordance with the present invention, the telephone 36 may also be used to configure and diagnose the CG 20 as will be described hereinafter. The I/O interfaces 42, 38, 34, 35 between the CG 20 and the broadband network 42, the TV/VCR 40 and the phone 36 respectively on the back of the CG 20 are shown in FIG. 2B.

Figure 5:
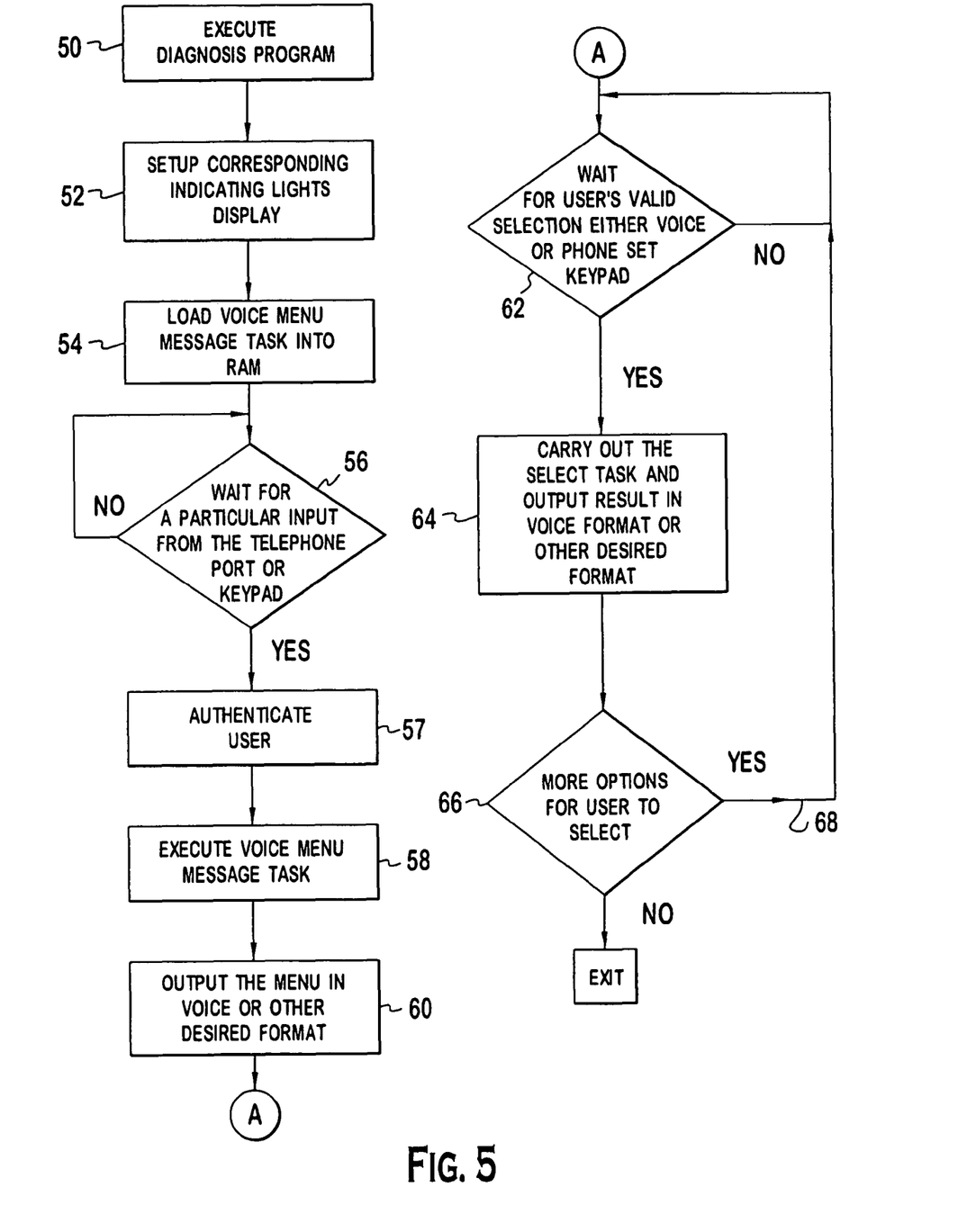
FIG. 5 is a flow chart of the voice interface implementation of the invention.

A customer or service personnel may configure or diagnose the CG 20 of the present invention utilizing the procedure shown in FIG. 5. The telephone module 31 processes the voice input analog signals and converts these analog signals into digital signals. Meanwhile, using this telephone module 31, the system can convert files with digital data into voice output and read them to the end user. Additionally, a user can use the keypad of the telephone 36 or the keypad 45 located on the face of the CG 20 as an alternate input device 5.

After the CG 20 is powered on, the microprocessor 22 will load a copy of the power-on confidence test program (test program) from the ROM 28 to the RAM 26, where the test program will be executed (step 50) by the microprocessor 22. The indicating lights 46 will be energized at predetermined intervals to show various statuses of different hardware components (step 52) within the CG 20. It should be noted that the only CG 20 components in FIG. 4 are those which may be needed for the operation of the present invention. Those of skill in the art would clearly recognize that a typical CG 20 includes many other components which are essential to the processing of voice, audio and video signals and other data for many different processes. Although there are very few components shown in FIG. 4 for describing the present invention, it should be understood by those of skill of in the art that many more components within the CG 20 will be diagnosed and configured using the present invention. Those components however, are not shown or described herein. However, those components are typically controlled by a microprocessor, which may be the same or different then microprocessor 22. In any event, microprocessor 22 will oversee all diagnostic testing within a CG 20.

Referring back to FIG. 5, if the test result shows that the components within the CG 20 are functional, then one or more indicating lights 46 will be energized as an indication that the CG 20 and all associated functions including voice data, video and audio communications are working. If there is a problem with a particular component within the CG 20, the indicating lights 46 are also selectively energized. The microprocessor 22 then loads a voice menu message task program (message task program) into RAM 26 (step 54). The particular message task program constantly monitors for a voice input from the telephone interfaces 34, 36 (step 56) or a data input from the keypad of the telephone set 36 or the keypad 45 on the face of the CG 20.

The message task program is utilized by giving a particular voice command via the telephone set 36, or by pushing a particular key or a combination of keys on the keypad of the telephone 36 or the CG keypad 45. This input essentially comprises a keyword for initializing the message task program. The first task of the message task program is to authenticate the user (step 57). The authentication process can comprise requiring the user to input a password which is compared to a password stored in memory voiceprint identification by comparing a user's voice command to a voice file stored in memory. In this manner, the message task program verifies whether the user is a valid user.

Once the user has been authenticated, the activated message task program (step 58) will read out a first list of possible task selections to the user through the telephone set 36 (step 60). Then the message program task program will wait for the user's selection using a voice command or an input from one of the keypads 45, 36 (step 62). Once the message task program receives a valid selection from the user for the available tasks, the message task program will perform the selected task and output the result of the executed task in voice format to the user (step 64). Next, the message task program can read out an additional list of subtasks (step 66), and the user can either further select one of the available subtasks for the message task program to perform by returning to step 62, or may exit, whereby the program returns to step 56 to wait for a user to enter the authentication process.

The message task program and its relevant files can be loaded into the RAM 26 from the ROM 28 or, in order to conserve memory, the message task program may be downloaded from the system administrator through the CATV network. The message task program provides a multi-level list of selectable tasks from which the user may select. Each list of tasks has a corresponding voice file. If the output to the user is selected by the user to be in audible format, the message task program retrieves the corresponding voice file associated with the list of tasks from memory, which will be output through the telephone module 31 to the telephone 36. Therefore, the user can select a task based on the list of tasks that they heard by responding via a voice command or selecting a key on one of the keypads 45, 36.

By providing different access codes to different users, the system can execute different lists of tasks or levels of security for different users. For example, the employees of the CATV network administrator have access codes with the highest level of security to invoke the full extended selections of lists of tasks, while a customer with a regular access code and a low level of security may only be able to invoke a limited number of tasks, or none at all.

Figure 6:
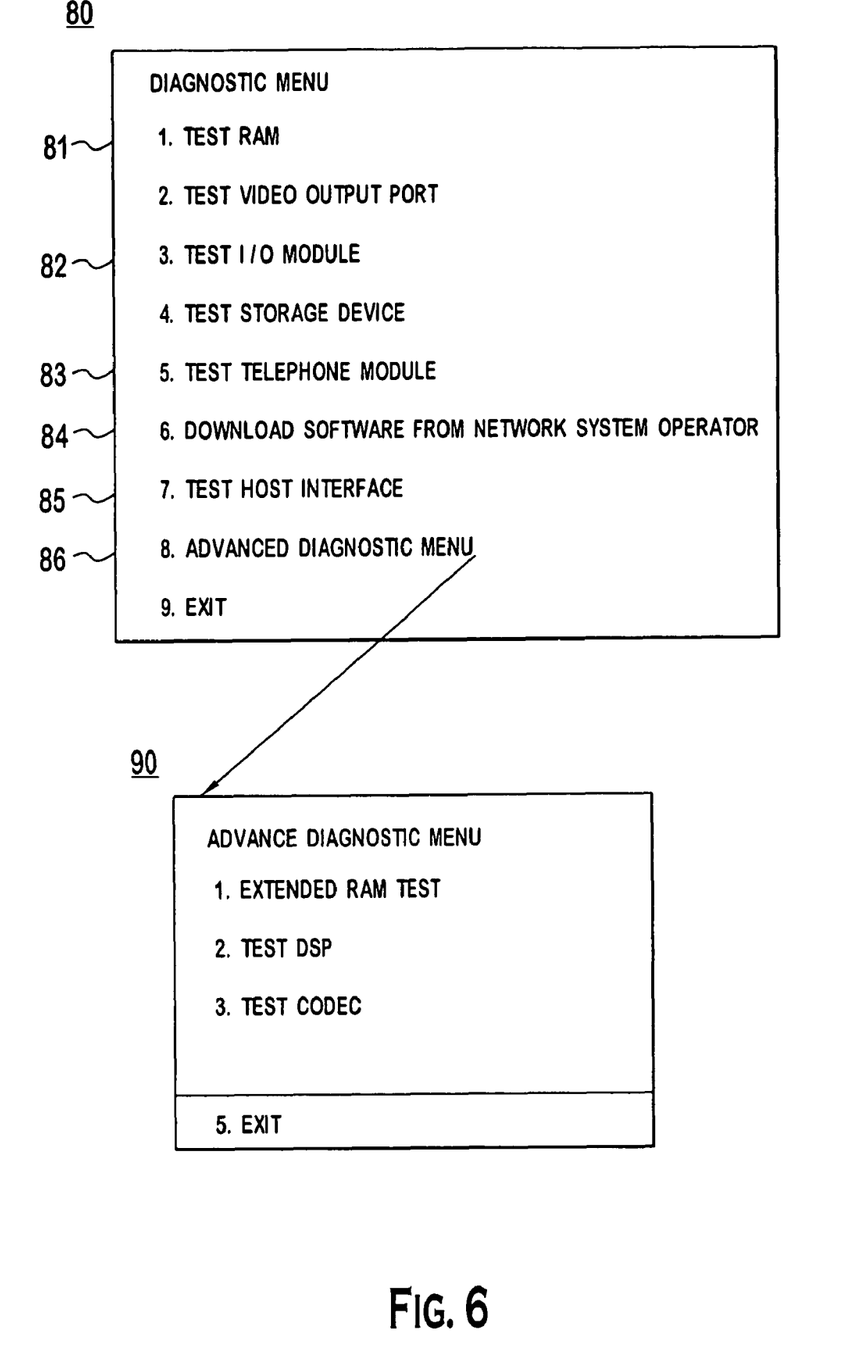
FIG. 6 is a two-level diagnostic menu.

Referring to FIG. 6, the message task program will retrieve a voice file corresponding to the first level diagnostic menu 80, the voice file is corresponds to the menu 80 in WAV or any other format. Throughout the processing of the menu 80, a selected option will be output to the user through the telephone 36. The user will hear a list of selections of different tasks, such as: "1) test RAM, 2) test video output port . . . " and so on until they hear the particular selection in which they are interested. If the user decides to run a RAM test (option 1), the user can respond with either a speaking voice command, such as "option one", or pushing the number "1" key on one of the keypads 45, 36. In case of voice input, the task program using speech recognition can interpret the user's voice command and run the RAM test program, thereafter reporting either "OK" or "error" back to the user. The user may also select option 8 which invokes a second level of diagnostics corresponding to the advance diagnostics menu 90. The task program will also retrieve a corresponding voice file for the advanced diagnostic menu 90 to process and read out all five task selections from the advance diagnostic menu 90 for the user to listen to and select. The task program will either respond to a user's invalid selection by reporting the list of selections again or just exit when no valid input was received within a predetermined period of time.

As hereinbefore discussed, it is possible to assign different access codes to different people. For example, a consumer having an access code with a minimum security level can activate a diagnostic menu, such as the first level diagnostic menu 80, but without the option to select the advanced diagnostic menu 90, option 8. In contrast, a trained technician can run the full extension of the first and the second level diagnostic menus 80, 90 or further download more diagnostic programs from the system administrator if such an option is available.

Although the CG has been used as an example for explanatory purposes, the invention can be implemented in all devices of the broadband network system. Such devices with the implementation of the present invention, are made much more user friendly, thereby lessening the burden on end users and reducing errors during the diagnosis software or hardware errors. If such devices typically do not have an associated handset, a user can connect a handset, and start to run diagnostic programs by voice command or key selection. The results of the selected diagnostic program will be communicated back in a voice format as aforementioned. It should be noted that although it has been described that hardware diagnostics can be performed using the present invention, any functions performed by software routines may also be diagnosed using the invention.

The invention claimed is:

1. A voice invoked method used in a device of a broadband communication network implemented with voice over interne protocol, comprising the steps of:
 a. invoking a main task by receiving a first input of a user;
 b. said main task providing a plurality of subtasks and outputting a corresponding selection menu in voice format;
 c. receiving a second input from a user responsive to the outputted menu;
 d. interpreting said second input and executing a selected subtask when said second input is interpreted as a valid selection which corresponds to the selected subtask; and
 e. outputting a report reflecting the result of executing said selected subtask in a voice format,
 wherein said selected subtask diagnoses and determines a status of said broadband communication network or said device, and
 the report indicates the status of said broadband communication network or said device.

2. The method of claim 1, wherein said first and second inputs are in voice format.

3. The method of claim 1, wherein said main task is invoked by a voice input or a dial tone input as said first input.

4. The method of claim 1, wherein said second input is a voice input or a dial tone input.

5. The method of claim 2, wherein at least one valid access code is provided and wherein invoking said main task comprises:
 a1. interpreting said first voice input; and
 a2. invoking said main task only if said first input is interpreted as a valid access code.

6. The method of claim 2, wherein providing a plurality of subtasks further comprising:
 b1. categorizing said access code into a plurality of access-code groups; and
 b2. the accessibility of said subtasks depending on said access code groups.

7. The method of claim 1, wherein said subtask is a multi-level with each level including a plurality of subtasks and their corresponding selection menu in voice format.

8. The method of claim 1, wherein invoking said subtasks further comprising the ability to download main tasks, subtasks and their related files from other network devices through said broadband communication networks.

9. A device configured to have voice invoked tasks implemented with voice over Internet protocol, comprising:
 a connection cable of connecting a telephone set with said device and receiving an input from a user through said telephone set and sending voice output from said device to said user through said telephone set;
 a memory storing a main task having a plurality of subtasks and its corresponding digital voice files;
 a first processor coupled to said connection cable and configured to convert the input from a user into a digital format and output a selected digital voice file to said user in a voice format; and
 a second processor operatively coupled to said first processor, the second processor having a capacity of checking the validity of inputs from a user, invoking said main task in response to a specified input from a user, executing one of said subtasks in response to a valid input from a user, and reporting the result of an executed subtask by selecting a corresponding digital voice file for said first processor to process,
 wherein said one of said subtasks diagnoses and determines a status of said device, and
 the result indicates the status of said device.

10. A device configured to have voice invoked tasks in a broadband communication network implemented with voice over Internet protocol, comprising:
 means for connecting a telephone set with said device;
 means for invoking a main task by a user's input through said telephone set;
 said main task means for providing a plurality of subtasks and their corresponding selection menu which will be output to said user in voice format;
 means for receiving a valid selection of said selection menu from said user;
 means for interpreting said user selection and executing said selected subtask; and
 means for voice reporting the result of executed subtask to said user,
 wherein said one of said subtasks diagnoses and determines a status of said device or said broadband communication network, and the result indicates the status of said device or said broadband communication network.

11. The device of claim 10, wherein means for invoking by a user's input further comprising a user's voice input.

12. The device of claim 10, wherein means for invoking by a user's input further comprising a user's input by using keypad of said telephone set.

13. The device of claim 10, wherein said subtasks including download update tasks, subtasks and their related files from other network devices through said broadband communication network.

14. The device of claim 10, wherein said device is a communication gateway in a cable television network implemented with voice over Internet protocol.

15. The device of claim 10, wherein said device is a settop box in a cable television network implemented with voice over Internet protocol.

16. The method of claim 1, further comprising:

f. authenticating the user for verifying whether the user is a valid user.

17. The method of claim 16, wherein the step f is performed by comparing a user's voice command to a voice file stored in a memory.

* * * * *